(12) United States Patent
Pratt et al.

(10) Patent No.: US 9,701,911 B2
(45) Date of Patent: Jul. 11, 2017

(54) PROCESS FOR CONVERTING FATS, OILS AND GREASES INTO FUELS

(71) Applicant: Research Foundation of the City University of New York, New York, NY (US)

(72) Inventors: Lawrence M. Pratt, New York, NY (US); Richard Steven Parnas, Storrs, CT (US)

(73) Assignees: Research Foundation of the City University of New York, New York, NY (US); University of Connecticut, Farmington, CT (US)

( * ) Notice: Subject to any disclaimer, the term of this patent is extended or adjusted under 35 U.S.C. 154(b) by 260 days.

(21) Appl. No.: 14/441,665

(22) PCT Filed: Nov. 8, 2013

(86) PCT No.: PCT/US2013/069085
§ 371 (c)(1),
(2) Date: May 8, 2015

(87) PCT Pub. No.: WO2014/074786
PCT Pub. Date: May 15, 2014

(65) Prior Publication Data
US 2015/0291889 A1 Oct. 15, 2015

Related U.S. Application Data

(60) Provisional application No. 61/724,511, filed on Nov. 9, 2012.

(51) Int. Cl.
| | | |
|---|---|---|
| *C10L 1/04* | (2006.01) | |
| *C10G 3/00* | (2006.01) | |
| *C10L 1/02* | (2006.01) | |

(52) U.S. Cl.
CPC ............... *C10G 3/40* (2013.01); *C10G 3/42* (2013.01); *C10G 3/44* (2013.01); *C10L 1/02* (2013.01); *C10L 1/04* (2013.01); *C10L 2200/0469* (2013.01); *C10L 2290/06* (2013.01); *C10L 2290/08* (2013.01); *C10L 2290/543* (2013.01); *C10L 2290/544* (2013.01); *Y02P 30/20* (2015.11)

(58) Field of Classification Search
CPC .... C10G 3/40; C10G 3/42; C10G 3/44; C10L 1/02; C10L 1/04; C10L 2200/0469; C10L 2290/06; C10L 2290/08; C10L 2290/543; C10L 2290/544
See application file for complete search history.

(56) References Cited

U.S. PATENT DOCUMENTS

| | | |
|---|---|---|
| 7,638,314 B2 | 12/2009 | Zappi et al. |
| 7,718,051 B2 | 5/2010 | Ginosar et al. |
| 7,868,214 B2 | 1/2011 | Marker |
| 7,928,273 B2 | 4/2011 | Bradin |
| 7,935,157 B2 | 5/2011 | Kozyuk et al. |
| 8,193,399 B2 | 6/2012 | Gosling |
| 2009/0069610 A1 | 3/2009 | Roberts, IV et al. |
| 2009/0283442 A1 | 11/2009 | McCall et al. |
| 2010/0175312 A1 | 7/2010 | Roden et al. |
| 2011/0197497 A1 | 8/2011 | Jiang |
| 2012/0055775 A1 | 3/2012 | Manderson et al. |
| 2012/0142983 A1 | 6/2012 | Vermeiren et al. |
| 2013/0137154 A1* | 5/2013 | Reep ............... C10L 1/1802 585/240 |
| 2013/0219774 A1* | 8/2013 | Venderbosch ......... B01J 23/002 585/240 |

OTHER PUBLICATIONS

Pratt, Lawrence M., Energy and Fuels 2012, Linus Books, ISBN 1-60797-221-2.
Zuo, Hualiang et al., Hydrodeoxygenation of Methyl Palmitate over Supported Ni Catalysts for Diesel-like Fuel Production, dx.doi.org/10.1021/ef300063b | Energy Fuels 2012, 26, 3747-3755.
Boucher, M.B et al., Variables affecting homogeneous acid catalyst recoverability and reuse after esterification of concentrated omega-9 polyunsaturated fatty acids invegetable oil triglycerides, 2008, Green Chemistry., 10, 1331-1336, The Royal Society of Chemistry.
Canakci, Mustafa, Production of biodiesel from feedstocks with high free fatty acids and its effect on diesel engine performance and emissions, Ph.D. Dissertation, 2001, Department of Mechanical Engineering, Iowa State University, Ames IA.
International Search Report from PCT application PCT/US2013/069085, Mar. 7, 2014, ISA/KR.

* cited by examiner

*Primary Examiner* — Sharon Pregler
(74) *Attorney, Agent, or Firm* — Peter J. Mikesell; Schmeiser, Olsen & Watts, LLP

(57) ABSTRACT

A method for producing a light oil fraction from plant-based and/or animal-based fats, oils or greases is disclosed. The method comprises introducing a feedstock including free fatty acids into a processing system. The system is heated at a controlled rate to a specified temperature, both of which are selected to produce a light oil fraction with a reduced fatty acid content. The system is permitted to reflux for a predetermined time, during which more of the light oil fraction is produced. The light oil fraction is separated from the remainder of the feedstock and contains less than 10% free fatty acids.

19 Claims, 1 Drawing Sheet

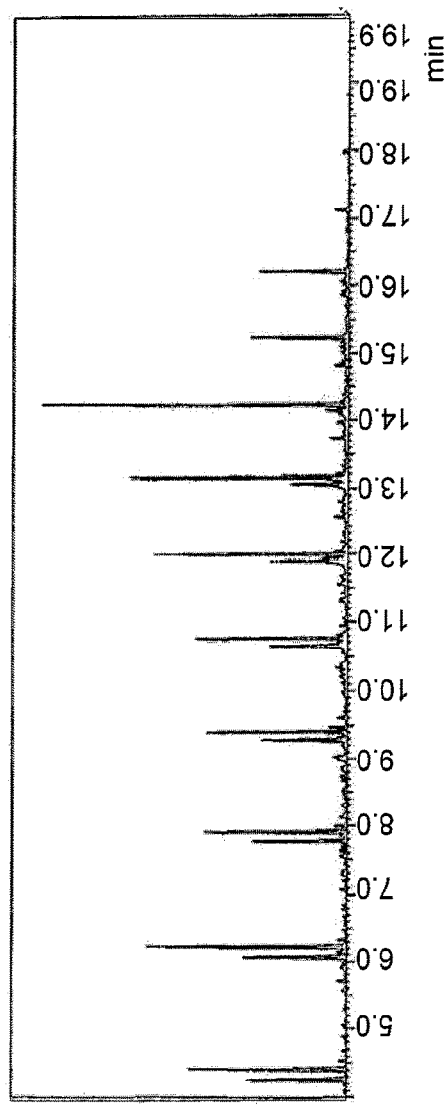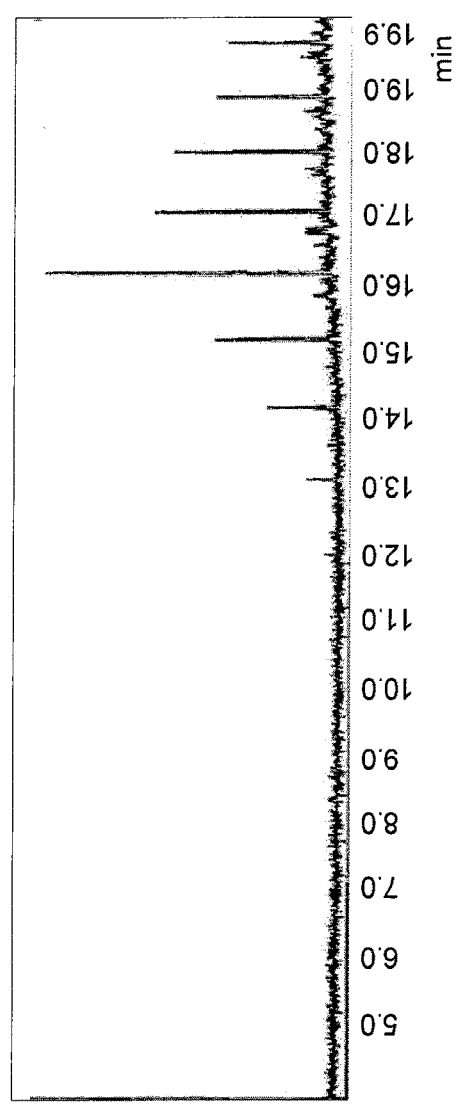

PROCESS FOR CONVERTING FATS, OILS AND GREASES INTO FUELS

CROSS-REFERENCE TO RELATED APPLICATIONS

This application claims priority to U.S. Provisional patent application No. 61/724,511 (filed Nov. 9, 2012) the entirety of which is incorporated herein by reference.

BACKGROUND OF THE INVENTION

The disclosure contained herein is in the general field of converting suitable feedstocks comprising fats, oils and greases into fuels, for example, into kerosene-range fuels. Some attempts have been made to transform biological materials (e.g. algae, etc.) into fuels. While these attempts have been at least partially successful, no single attempt has proven entirely satisfactory. For example, feedstocks that are high in free fatty acids (FFA) are difficult and more energy intensive to convert to fuels. It is therefore desirable to provide an alternative method for converting renewable resources, especially those that are rich in FFAs, into materials that may be used as a fuel.

The discussion above is merely provided for general background information and is not intended to be used as an aid in determining the scope of the claimed subject matter.

BRIEF DESCRIPTION OF THE INVENTION

A method for producing a light oil fraction from plant-based and/or animal-based fats, oils or greases is disclosed. The method comprises introducing a feedstock including free fatty acids into a processing system. The system is heated at a controlled rate to a specified temperature, both of which are selected to produce a light oil fraction with a reduced fatty acid content. The system is permitted to reflux for a predetermined time, during which more of the light oil fraction is produced. The light oil fraction is separated from the remainder of the feedstock and contains less than 10% free fatty acids. An advantage that may be realized in the practice of some disclosed embodiments of the method is ability to produce a light oil fraction with reduced free fatty acids from a renewable source of fatty acids.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 1A and FIG. 1B are gas chromatograms of a light oil fraction and a heavy oil fraction, respectively, obtained by pyrolysis of brown grease.

DETAILED DESCRIPTION OF THE INVENTION

A process for converting fats, oils and greases to straight chain alkanes and alkenes in the C8 to C21 range is disclosed. This process may be used, among other things, for the purpose of making kerosene range fuels such as jet fuel. This process does not require catalysts, although catalysts may be used if desired. Relatively mild conditions may be employed. According to one aspect, the process works by balancing decarboxylation and cracking reactions. According to another aspect, the process works by combining a reactor with a distillation apparatus.

Triglycerides and free fatty acids (FFA) are the major constituents in vegetable oils and animal fats. Waste products from the food industry, for example yellow and brown grease, therefore also are mainly comprised of triglycerides and free fatty acids, as well as various other contaminants picked up from the cooking and disposal processes. A "grease" may be an unknown combination of oils and fats.

Yellow grease is a higher grade of waste consisting primarily of triglycerides, and smaller amounts of FFA and water. Because of the low FFA and water content, yellow grease is often used for biodiesel synthesis via a simple base catalyzed process preceded by a mild acid catalyzed pretreatment (M. B. Boucher et al.; Variables Affecting Homogeneous Acid Catalyst Recoverability and Reuse After Esterification of Concentrated Omega-9 Polyunsaturated Fatty Acids in Vegetable Oil Tri glycerides, *Green Chemistry*, 10, 1331-1333, 2008). Brown grease is a lower grade of waste which comprises of free fatty acids (FFA's), biosolids, and water with smaller amounts of triglycerides. Brown grease generally contains between 50% and 100% FFA (Canakci, M. 2001. Production of biodiesel from feedstocks with high free fatty acids and its effect on diesel engine performance and emissions. Ph.D. Dissertation, Department of Mechanical Engineering, Iowa State University, Ames, Iowa) Because of the high FFA content, conversion of brown grease to biodiesel has traditionally required a more difficult and more energy intensive acid catalyzed pretreatment process. Due to this difficulty in converting brown grease to biodiesel, brown grease is typically not converted and remains an unused waste product.

Petroleum comprises low molecular weight alkanes (naptha), cycloalkanes (napthenes), aromatic compounds, and aliphatic and aromatic compounds containing oxygen, nitrogen, sulfur, and other elements (Pratt, L. M. *Energy and Fuels* 2012, Linus Books, ISBN 1-60797-221-2). Petroleum usually also contains dissolved natural gas. During the refining process, the methane, ethane, propane, and butane are processed as liquified petroleum gas (LPG). Straight run gasoline is a low octane fuel with mostly straight chain and C2-methyl substituted alkanes from $C_7H_{16}$ to about $C_{11}H_{24}$. The boiling range of gasoline varies by season, but it is generally in the 70-180° C. range. The next fraction is kerosene, a major component of jet fuel. Kerosene boils in the 150-275° C. range, and comprises alkanes in the $C_{11}H_{24}$ to $C_{15}H_{32}$ range, together with aromatics and cycloalkanes. Kerosene typically has an aromatic content of between 10 and 40%. Kerosene fractions are then typically further processed to various grades of jet fuel by further distillations and the addition of specialized additives.

Gas oil is a heavier fraction of petroleum and a major component of diesel fuel. Gas oils boil between 270 and 400° C., and comprise alkanes with 15-25 carbon atoms, in addition to cyclic, bicyclic, and tricyclic aromatics and cycloalkane systems. Heavier fractions are used as lubricating oils or cracked to lower molar mass compounds for fuels.

Alkanes are the most valuable components of petroleum for fuel production. A source comprising primarily of alkanes will therefore be desirable for fuel production. Although alkenes are less stable to oxidation and burn less cleanly than alkanes, they are easily converted to alkanes by catalytic hydrogenation. Examples of current state-of-the-art research are given in elsewhere in this specification, where special catalysts are used to decarboxylate fats, oils and greases. Exemplary catalysts include palladium, palladium on carbon and other similar catalysts.

Several new processes are in development to produce jet fuel from renewable resources such as algae, and these processes will also require the application of decarboxylation and cracking reactions, as well as various separation strategies. The components of renewable feedstocks such as algae that are converted to jet fuels fall under the heading of fats, oils, and greases noted above. Thus, the present disclosure covers a wide range of feedstocks, including waste oils such as yellow and brown grease, food and non-food plant oils such as corn oil and jatropha oil, as well as aquaculture derived oils from algae, bacteria, seaweeds, etc.

EXAMPLES

Example 1

Sample Preparation and Characterization

A sample of brown grease containing water and bio-solids was obtained from Onsite Environmental in Nashville, Tenn. The brown grease was first heated to roughly 65° C. in a beaker to allow most of the water and the bio-solids to settle to the bottom, and the upper liquid oil fraction was decanted into a separate container.

The upper liquid oil fraction was found to contain approximately 89 mass % free fatty acid by titration, with the remainder almost entirely triglycerides. The composition of the free fatty acids and triglycerides in the upper liquid oil fraction was assessed by converting the material to the corresponding methyl esters and analyzing the product with gas chromatography/mass spectroscopy. The upper liquid oil fraction was converted to the methyl esters by refluxing for 24 hours with methanol in the presence of a sulfuric acid catalyst. The methyl esters observed were palmitic acid ($C_{16}H_{32}O_2$) and saturated, mono-unsaturated, and di-unsaturated C18 fatty acid methyl esters. A smaller amount of methyl tetradecanoate (C14), and traces of other fatty acid methyl esters were also present.

A 30.73 g sample of the upper liquid oil fraction was heated in a round bottom flask. This oil sample was initially heated to approximately 95° C. and held at pressures less than 1 atmosphere for several hours to remove the remaining water. In another embodiment, the pressure is held at less than 0.5 atmosphere. In one embodiment, the liquid oil fraction has less than about 0.5% water. In another embodiment, the liquid oil fraction has less than about 0.1% water.

Inventive Procedure and Results

Step 1: The pressure was restored to 1 atmosphere after the sample preparation and characterization noted above. The round bottom flask was fitted with a fractionating column filled with glass beads, a condenser, and a receiving flask. The sample was then heated to 340° C. in approximately 1 hour (about 315° C. per hour). During this atmospheric pressure stage of the process, the fractionating column mounted on top of the reaction flask refluxed a portion of the vaporized material back into the reaction flask. The temperature was held at approximately 340° C. for 16 hours. During this period of time, 10.23 g of liquid was condensed at 15° C. from the vapor that passed through the fractionating column. This liquid obtained during atmospheric pressure operation at approximately 340° C. is termed the "light oil fraction."

Step 2: After collecting the light oil fraction for 16 hours, the flask was cooled to room temperature and then the fractionating column was removed. The flask was then connected to a vacuum pump, and the flask was heated with a Bunsen burner to temperatures above 400° C. Vapors expelled from the flask were condensed at 15° C. until no more liquid was obtained. After condensation, 9.19 g of liquid was obtained from the expelled vapors during this stage of the process. We refer to the liquid obtained during this vacuum stage at temperatures above 400° C. as the "heavy oil fraction."

Step 3: The residue remaining after collection of the heavy oil fraction was washed with heptane. A portion of the residue dissolved in the heptane and is termed tars while the heptane insoluble fraction is termed coke and ash. The masses of all the fractions obtained in this example are recorded in the first row of Table 1.

TABLE 1

Effects of reaction conditions on recovered product masses.

| | First Period | | | | Second Period | Residue | |
| --- | --- | --- | --- | --- | --- | --- | --- |
| Mass, g | Heating time hr | Total Hrs @1 atm | light oil, (%) | FFA, g | heavy oil, g (%) | tar, g (%) | coke and ash, g |
| 30.73 | 1 | 16 | 10.23 (33.3) | 1.67 (5.43) | 9.19 (29.9) | 0.27 (0.88) | 1.88 (6.12) |
| 35.92 | 6 | 16 | 12.28 (34.2) | <0.36 (<1) | 12.00 (33.4) | 0.41 (1.14) | 2.39 (6.65) |
| 35.14 | 6 | 30 | 22.45 (63.9) | (0.35 (<1) | 1.15 (3.27) | Trace | 2.23 (6.35) |

An important aspect of at least some embodiments of the invention is the reduction in the amount of free fatty acid observed in the light oil fraction since fuel fractions containing oxygen can produce poor cold weather performance and reduce oxidation stability. The fatty acid component in the light oil fraction was assessed by centrifuging the light oil fraction and removing the residue obtained. The residue was found to be nearly 100% free fatty acid in the C6 to C10 range, and weighed 1.67 g, constituting 5.43% of the original sample mass, or 16.3% of the light oil fraction mass. In contrast, the upper liquid oil fraction was 89% free fatty acid prior to treatment. In one embodiment, the light oil fraction contains less than 10% fatty acids. In another embodiment, the light oil fraction contains less than 1% fatty acids.

The compositions of the light oil fraction and the heavy oil fraction were obtained by gas chromatography-mass spectrometry, after removal of any traces of free fatty acids by filtration through silica gel. Although long chain hydrocarbons easily fragment in the mass spectrometer, the identification of specific compounds was accomplished with high confidence by combining the observed homologous series with identification by computer database. A homologous series of n-alkanes from C8 to C21 was produced. In addition, 1-alkenes were produced from C8 to C15, with the amount of alkene decreasing in relation to the corresponding alkane after C11, with only a small amount of 1-pentadecene being produced. The gas chromatograms of the light oil fraction and the heavy oil fraction are shown in FIG. 1A and FIG. 1B, respectively. In the figures, alkanes are a homologous series from octane (retention time 4.41 min.) to heneicosane (19.60 min.). 1-Alkene peaks are seen to the left of the alkane peak up to 1-pentadecene.

Example 2

A sample of brown grease containing water and bio-solids was obtained from the Torrington, Conn. wastewater treatment facility. Sample preparation and characterization were conducted just as with Example 1, and the free fatty acid content of the upper liquid oil fraction was found to be approximately 88%, with the remainder predominantly triglycerides. The methyl esters observed in the upper liquid oil fraction were palmitic acid ($C_{16}H_{32}O_2$) and saturated, mono-unsaturated, and di-unsaturated C18 fatty acid methyl esters. A smaller amount of methyl tetradecanoate (C14), and traces of other fatty acid methyl esters were also present.

A 35.92 g sample of the oil was heated in a round bottom flask equipped with a glass bead filled fractionating column, a condenser, and a receiving flask. The oil sample was initially heated to approximately 95° C. and held at pressures less than 0.5 atm. for several hours to remove the remaining water.

In example 2, the sample of the oil was heated to approximately 340° C. over a time period of 6 hours (approximately 50° C. per hour), more slowly than in example 1, with the pressure at 1 Atm. The configuration of the equipment was the same as in example 1. The pressure remained at 1 atmosphere for 16 hours, and the collection of the light oil fraction was conducted in the same way as example 1. A mass of 12.28 g of light oil fraction was collected, or 34.2% of the sample mass. In contrast to example 1, the free fatty acid content of the light oil fraction was analyzed to be less than 0.36 g, or less than 1% of the sample mass. In other embodiments, the temperature at least 300° C., for example, between 300° C. and 400° C. This temperature may be reached by increasing the temperature at a rate of, for example, less than about 70° C. per hour.

The heavy oil fraction, tars and coke and ash fractions were collected in the same way as in example 1. The masses of all the fractions collected in example 2 are recorded in the second row of Table 1.

Example 3

Example 3 was conducted exactly as example 2 except that the period of time the experiment was conducted at was increased to 30 hours with the other parameters (1 Atm. pressure and approximately 340° C.) being unaltered. The mass of the upper liquid oil fraction placed into the round bottom in Example 3 was 35.14 g. In this example, the mass of light oil fraction recovered was 22.45 g, or 63.9% of the sample mass. The free fatty acid content of the light oil fraction was less than 0.36 g, or less than 1% of the sample mass. All masses of fractions recovered are recorded in the third row of Table 1.

The mass listed in column 1 is the mass of oil initially placed into the flask. In addition to the mass fractions of reaction products listed in Table 1, the oil samples also released water and carbon dioxide, and perhaps very light hydrocarbons that did not condense in the experimental equipment.

In the first example (first row, Table 1), the temperature increased from 95 C to 340° C. in approximately 1 hour. In the $2^{nd}$ and $3^{rd}$ examples, approximately 6 hours were required to raise the temperature from 95° C. to 340° C. The reduction in free fatty acids observed in the light oil fraction in examples 2 and 3 compared to example 1 indicates that the heating rate may be important to control the free fatty acids in the light oil fraction. The period of time the reacting mixture was held at 1 atmosphere pressure and 340° C. was 16 hours in examples 1 and 2, and 30 hours in example 3. The increase in the fraction of sample converted to the light oil fraction in example 3, compared to examples 1 and 2 indicates that the time at 1 atmosphere and 340° C. played an important role in determining the split between the two fractions.

Without being held to the following discussion, we hypothesize that certain reactions may be occurring in examples 1, 2 and 3. The large reduction in the amount of free fatty acids observed in the light and heavy oils, compared to the free fatty acid fraction in the samples placed in the round bottom flask, indicates that decarboxylation is most likely a primary reaction. The absence of any significant amount of C14 and higher carboxylic acids in the light or heavy oil fractions indicates that decarboxylation is probably not the only primary reaction. If it was the only major reaction, it is expected that the products would consist essentially of hydrocarbon chains 1 carbon shorter than the starting free fatty acids; primarily, pentadecane (C15), heptadecane (C17), and heptadecenes (C17).

The presence of C6-C10 carboxylic acids, especially in example 1, may indicate that some chain cleavage occurred at a rate comparable to the decarboxylation reactions, and those acids distilled out of the reaction mixture. The lower free fatty acid content in examples 2 and 3, with the slower heating rate, may indicate that the decarboxylation reactions occurred more prevalently at the slower heating rates, and then the chain cleavage reactions occurred over a longer period of time.

Thermal cracking of petroleum occurs primarily by radical mechanisms, and radicals are more easily formed by bond cleavage at a carbon adjacent to a double bond. The high molar mass free fatty acids are nearly all unsaturated in at least one location. Radical formation and recombination is consistent with the formation of hydrocarbons in the C8-C21 range in the pyrolysis products. The formation of more of the light oil fraction with longer periods of distillation at atmospheric pressure is consistent with an equilibration between radical species, which recombine randomly to form alkanes. As the lower molar mass alkanes distill out of the reaction mixture, the continued equilibration of the radicals is expected to produce more of the light oil fraction at the expense of the heavier oil.

In the specific embodiments discussed above, heating brown grease generates a mixture of straight chain alkanes in the C8-C21 range, with smaller amounts of 1-alkenes in the C8-C15 range. Fatty acids from C6-C10 are also formed, but the use of a fractionating column and controlled heating rate can minimize the amount of fatty acids in the light oil fraction produced. Comparison of the reaction products with methyl esters of the brown grease fatty acids shows a significant difference in chain lengths, which suggests the involvement of equilibrating free radicals and cracking reactions in the conversion mechanism.

Disclosed herein is a processing system to control the heating rate of the feedstock and at the same time control the fractionation and reflux of the produced vapors. Heating the feedstock creates a reacting mixture, and the results indicate that the reactions are predominantly decarboxylation reactions and cracking reactions. A feature disclosed herein is a means for controlling the initial heating rate of the feedstock to balance the decarboxylation and cracking reactions, and thereby control the volatilization of short chain free fatty acids. During the initial period of heating at atmospheric pressure, a light oil fraction is formed and separated from the reaction mixture by vaporization and fractionation.

A further feature disclosed herein is a means of refluxing a portion of the vapor from the fractionator back to the reactor to control the residence time of the vaporized species in the reactor. Thus, the heating rate and the fractionation provide two mechanisms to balance the reactions, attaining control of the product composition. For the production of high value fuels, one disclosed feature of the process is to minimize the free fatty acid content of the produced light oil fraction.

While the specific examples noted above discussed a batch system carried out in a round bottom flask, the concepts enumerated herein may equally be applied to continuous reaction and fractionation systems, and to hybrid systems where the reaction is carried out in a batch reactor while the fractionation is carried out continuously, or where the reaction is carried out continuously while the fractionation is carried out in batches.

While the specific examples noted above did not explicitly exercise control over the oxygen content in the processing system, a variation of the disclosed system comprises means where the oxygen content is controlled by one or more of various approaches including, but not limited to, the use of a sweep gas, sealing the system, and evacuating the system.

The specific examples noted above generated the light oil fraction at atmospheric pressure, but a variation of the disclosed system comprises means whereby the light oil fraction is generated at a pressure other than 1 atmosphere in order to optimize the integration of the fractionation system with the reaction system.

While the examples noted above used the separated oil layer from brown grease as a feedstock, the scope and spirit of the disclosed invention comprises use of various other feedstocks that may include, by way of non-limiting examples, free fatty acids and/or triglycerides such as yellow grease, virgin oils including vegetable oils such as corn oil, animal fat, yellow grease, brown grease, acidulated bone, algae oil, oil from bacteria, oil from seaweeds, combinations of different oils and others.

The disclosed decarboxylation and cracking reactions are expected to occur upon heating any of the various feedstocks comprising free fatty acids and/or triglycerides. Therefore, one embodiment of this invention comprises a system to use both heating rate and a fractionation system as tools to balance the two reaction types and such a system comprises capability to work with any of the various feedstocks comprising free fatty acids and/or triglycerides.

Features of the disclosed method and system comprise, by way of non-limiting examples, non-catalytic, low-to-no oxygen pyrolysis strategy; balanced decarboxylation and cracking reactions; and, integrated separation with a reactor to produce a molecular weight dependent residence time in the reactor.

In one embodiment, the mass from the feedstock is at least 20% converted into the light oil fraction within about 10 to 24 hours. In another embodiment, the feedstock is at least 40% converted into the light oil fraction within about 10 to 24 hours. In another embodiment, the feedstock is at least 30% converted into the light oil fraction within about 6 hours. In another embodiment, the feedstock is at least 60% converted into the light oil fraction within about 30 hours.

While a detailed analysis of the gas products has not yet been done, the hypothesis of low temperature decarboxylation of the fatty acids was tested by bubbling the evolved gas into a saturated $Ba(OH)_2$ solution. As the temperature was increased above 100° C., air and water vapor bubbled through the solution, and at 190° C. the first $BaCO_3$ precipitate was observed, indicating the onset of decarboxyalation. To our knowledge, that is the lowest temperature ever reported for decarboxyation of a common mono-carboxylic acid. Known catalysts are used to facilitate the decarboxylation of fats, oils and greases. FFA can be deoxygenated via decarboxylation, which produces paraffinic hydrocarbon via the removal of the carboxyl group with release of carbon dioxide:

$$C_{17}H_{35}COOH \rightarrow n\text{-}C_{17}H_{36} + CO_2 \qquad (1)$$

Decarboxylation was first demonstrated in liquid phase with the conversion of stearic acid over a metal catalyst supported by carbon. Carbon supported metal catalysts have been shown to catalyze decarboxylation reaction at temperatures of 300-360° C. and high pressures to maintain reactants such as saturated and unsaturated FFAs in liquid phase. With decarboxylation of the latter leading to saturated diesel fuel range products and n-heptadecane and N-pentadecane with fairly good selectivities. The gaseous effluents were indicative of deoxygenation pathways described above. Pd/C, with 5% Pd content, exhibited the highest initial decarboxylation rate which deteriorated because of reduction in catalyst pore size due to decarbonylation switchover. Catalyst deactivation was investigated in a fed-batch process or continuous systems with both downward and upward flow. In fed batch systems, the catalyst deactivation was shown to be reduced by reduction in $H_2$ and CO partial pressures and ceasing the FFA feed. In continuous systems, catalyst deactivation was worsened by reduced residence times and high feed rates which however enhanced high n-alkane selectivity. Higher temperatures enhanced conversion without being conducive to n-alkane selectivity. Other published methods have major drawbacks when applied to brown grease and similar substrates. Careful preparation of the catalyst is required, and many of the catalysts are subject to possible contamination from the numerous impurities in the FOG. Some of the catalytic systems require the use of precious metals, platinum and palladium, and a hydrogen atmosphere is also sometimes required. Those catalysts are susceptible to deactivation by some metals, nitrogen compounds, and sulfur compounds, which are likely to be present in brown grease. In other cases a less expensive nickel catalyst is used, but careful preparation and pretreatment with hydrogen is then desired. In those systems a range of hydrocarbons were produced from pure feed stocks. Transition metal oxides have catalyzed pyrolysis of C17 fatty acids to C16 hydrocarbons, but supercritical water was required. Catalysts based on group II metals have been developed for decarboxylation as a tool for removal of naphthenic acids from petroleum. Again, those catalysts require careful preparation at temperatures of up to 800° C. Because of the significant water solubility of group II metal oxides and the significant amount of water in brown grease, those catalytic systems would not be expected to survive long under the actual reaction conditions. It should also be noted that even when the brown grease is dried at 80° C. under vacuum, water is formed during pyrolysis. It remains uncertain whether the brown grease holds the water tightly, or if water is produced during the pyrolysis reactions. Either way, a water sensitive catalyst is unsuitable for this system. Radical, cationic, and anionic mechanisms have all been proposed for metal catalyzed decarboxylation reactions.

While the invention has been described with reference to preferred embodiments, it will be understood by those skilled in the art that various changes may be made and equivalents may be substituted for the elements thereof without departing from the scope of the invention. In addition, many modifications may be made to adapt the teaching of the invention to particular use, application, manufacturing conditions, use conditions, composition, medium, size, and/or materials without departing from the essential scope and spirit of the invention. Therefore, it is intended that the invention not be limited to the particular embodiments and best mode contemplated for carrying out this invention as described herein.

REFERENCES

All documents cited herein and the following listed documents, are hereby incorporated by reference in their entirety:

M. B. Boucher, S. A. Unker, K. R. Hawley, B. A. Wilhite, J. D. Stuart and R. S. Palmas, Variables Affecting Homogeneous Acid Catalyst Recoverability and Reuse After Esterification of Concentrated Omega-9 Polyunsaturated Fatty Acids in Vegetable Oil Tri glycerides, *Green Chemistry*, 10, 1331-1333, 2008.

Canakci, M. 2001. Production of biodiesel from feedstocks with high free fatty acids and its effect on diesel engine performance and emissions. Ph.D. Dissertation, Department of Mechanical Engineering, Iowa State University, Ames, Iowa Pratt, L. M. *Energy and Fuels* 2012, Linus Books, ISBN 1-60797-221-2.

H. Zuo, Q. Liu, T. Wang, L. Ma, Q. Zhang and Q. Zhang, Hydrodeoxygenation of Methyl Palmitate over Supported Ni Catalysts for Diesel-like Fuel Production, *Energy Fuels*, 26, 3747-3755, 2012

US Patent publication 20110197497
U.S. Pat. No. 7,638,314
U.S. Pat. No. 7,718,051
U.S. Pat. No. 7,868,214
U.S. Pat. No. 7,935,157
U.S. Pat. No. 8,193,399
US Patent publication 2010/0175312

What is claimed is:

1. A method for producing a light oil fraction with low fatty acids from plant-based and/or animal-based fats, oils or greases, the method comprising:
    introducing a feedstock comprising free fatty acids into a processing system;
    heating the feedstock at a predetermined rate to a predetermined temperature, the predetermined rate selected to produce a light oil fraction with a reduced fatty acid content;
    permitting the feedstock to reflux by reacting the feedstock under a cracking reaction and a decarboxylation reaction at the predetermined temperature for a predetermined time, wherein the predetermined time is selected to produce the light oil fraction with the reduced fatty acid content;
    separating the light oil fraction from the remainder of the feedstock, wherein the separated light oil fraction contains less than 10% free fatty acids;
    wherein the predetermined temperature is at least 300° C., and the predetermined rate is less than 70° C. per hour.

2. The method of claim 1, further comprising drying the feedstock prior to the step of introducing, such that the feedstock has less than about 0.5 percent water.

3. The method of claim 1, wherein the feedstock has less than about 0.1 percent water.

4. The method of claim 2, wherein the step of drying comprises heating the feedstock while under a pressure of less than 1 atmosphere to remove water.

5. The method of claim 1, wherein the light oil fraction contains less than 1% free fatty acids.

6. The method of claim 1, wherein the feedstock comprises at least one of a virgin oil, an animal fat, a yellow grease, or a brown grease.

7. The method of claim 1, wherein the feedstock comprises at least one oil selected from the group consisting of corn oil, oil from algae, oil from bacteria, oil from seaweeds and combinations thereof.

8. The method of claim 1, wherein the step of separating the light oil fraction from the remainder of the feedstock comprises condensing the light oil fraction.

9. The method of claim 1, wherein the feedstock has a feedstock mass and more than about 20% of the feedstock mass is converted to the light oil fraction within about 10 hours to about 24 hours of starting the step of permitting the feedstock to reflux.

10. The method of claim 1, wherein the feedstock has a feedstock mass and more than about 40% of the feedstock mass is converted to the light oil fraction within about 10 hours to about 24 hours of starting the step of permitting the feedstock to reflux.

11. The method of claim 1, wherein the feedstock has a feedstock mass and more than about 30% of the feedstock mass is converted to the light oil fraction within about 6 hours of starting the step of permitting the feedstock to reflux.

12. The method of claim 1, wherein the feedstock has a feedstock mass and more than about 60% of the feedstock mass is converted to the light oil fraction within about 30 hours of starting the step of permitting the feedstock to reflux.

13. The method of claim 1, wherein the predetermined temperature is between 300° C. and 400° C.

14. The method of claim 1, wherein the light oil fraction is separated from the reacting mixture by use of a vapor/liquid separator that:
    cools vapor rising from the reacting mixture to a temperature below 250° C.; returns condensed liquid to the processing system; and
    allows uncondensed components of the vapor that was cooled to a temperature below 250° C. to pass through a cooling element of the vapor/liquid separator and the uncondensed components, after being exposed to condensation conditions, comprise the light oil fraction.

15. The method of claim 1, wherein the processing system is catalyst-free.

16. The method of claim 1, further comprising adding at least one catalyst to the processing system.

17. The method of claim 1, wherein the predetermined rate is constant throughout the step of heating the feedstock.

18. The method of claim 1, further comprising extracting the feedstock from a biological organism.

19. The method of claim 1, wherein the feedstock consists essentially of fatty acids and triglycerides.

* * * * *